United States Patent [19]

Yamashita et al.

[11] 4,064,219

[45] Dec. 20, 1977

[54] METHOD OF INJECTING AMMONIA INTO A FLUE FOR WASTE GASES

[75] Inventors: Yuzo Yamashita, Kobe; Masahiro Kishi; Yasumasa Ishibashi, both of Akashi, all of Japan

[73] Assignee: Mitsubishi Jukogyo Kabushiki Kaisha, Japan

[21] Appl. No.: 601,337

[22] Filed: Aug. 4, 1975

Related U.S. Application Data

[63] Continuation-in-part of Ser. No. 230,400, Feb. 29, 1972, abandoned.

[51] Int. Cl.$^2$ .................. C01B 17/00; C01C 1/24
[52] U.S. Cl. .................................. 423/242; 423/545
[58] Field of Search ....................... 423/242–244, 423/545; 23/230 A, 232 R

[56] References Cited

U.S. PATENT DOCUMENTS

| 3,522,000 | 7/1970 | Kinney | 423/242 |
| 3,523,407 | 8/1970 | Humbert | 423/242 |
| 3,579,296 | 3/1971 | Cann | 423/242 |
| 3,767,763 | 10/1973 | Gustausson et al. | 423/220 |
| 3,843,789 | 10/1974 | Spector et al. | 423/242 |

Primary Examiner—O. R. Vertiz
Assistant Examiner—Gregory A. Heller
Attorney, Agent, or Firm—McGlew and Tuttle

[57] ABSTRACT

The method is characterized by bringing a mixture of ammonia and air to a temperature substantially equal to the temperature of the waste flue gas in the flue at the exit of an air heater, and then injecting the mixture into the flue from a number of nozzles arranged in uniformly spaced relation in the flue while regulating the respective flow rates thereof. The non-uniform distribution of sulfuric acid components and non-uniform temperature distribution in the exit flue are compensated by individually controlling the respective flow rates of the gaseous mixture discharged from the nozzles to conform the distribution of the injected ammonia to the measured sulfuric acid component distribution while adjusting the molar ratio of the injected ammonia to the sulfuric acid components, at each point having a nozzle, in accordance with the measured temperature at the respective point, to a value such that the resulting reaction product will not melt and adhere to any component, such as a precipitator, connected to the exit flue downstream of the air feeder.

2 Claims, 8 Drawing Figures

PHASE DIAGRAM OF $H_2SO_4 - (NH_4)_2SO_4$

METHOD OF INJECTING AMMONIA INTO A FLUE FOR WASTE GASES

CROSS REFERENCE TO RELATED APPLICATION

This application is a continuation-in-part of application Ser. No. 230,400, filed Feb. 29, 1972, for "Method of Injecting Ammonia Into A Flue For Waste Gases", now abandoned.

FIELD AND BACKGROUND OF THE INVENTION

This invention relates to the injection of ammonia into a flue for waste gases and, more particularly, to an improved method of injecting the ammonia.

For the purpose of preventing corrosion or generation of an acid smut on the low temperature side of an oil burning boiler, there has been proposed an apparatus for injecting ammonia into a flue for waste gases. As shown in FIG. 1, such an apparatus generally comprises a liquefied ammonia tank $a$, a liquefied ammonia evaporator $g$, nozzle pipes $c$ arranged within flue $b$ at the exit of an air heater and provided with equal size nozzles or openings $j$ and with shut-off valves $J$, for cleaning of the nozzles, orifices $d$, $d$, a mixing device $e$, a conduit $h$ connecting tank $a$ and evaporator $g$ with pipe $c$ and a conduit $f$ connecting the exit side of a forced draft fan with mixing device $e$. The arrangement is such that air supplied from the exit side of the forced draft fan and ammonia gas supplied from tank $a$ and evaporator $g$ are mixed in mixing device $e$ and the resultant mixture is injected into flue $b$ through the nozzles or openings $j$ to neutralize the sulfuric acid components in the waste flue gas, with ammonia. Arrangements of this type are shown, for example, in Hodsman et al U.S. Pat. No. 1,931,408 and Doramus et al U.S. Pat. No. 1,496,410.

The prior art apparatus has had the following disadvantages. Namely, ammonia is injected uniformly into the flue regardless of the distribution of sulfuric acid components in the waste flue gas. Therefore, when a Ljungstrom air preheater is used, with which the temperature distribution and sulfuric acid component distribution tend to become non-uniform at the exit of the heater, under the influence of rotation of the rotor, the amount of ammonia injected locally becomes either excessive or insufficient and, where the amount is insufficient, low melting point compounds are formed (although it has been considered that ammonia sulfate and acid ammonia sulfate are the products of neutralization with ammonia of the sulfuric acid components in a waste flue gas, the composition of the neutralization product is complicated by compounds of extremely low melting points, such as of about 50° C, which may possibly be formed depending upon the molar ratio of $NH_3$ : $H_2SO_4$), which attach to the nozzles to clog the same and promote corrosion rather than preventing it. The apparatus also has had the disadvantage that, since the ammonia-air mixture is injected into the flue at the normal temperature, the nozzle pipes are cooled, promoting the clogging of the nozzles with flue dusts.

SUMMARY OF THE INVENTION

The present invention, which obviates the above disadvantage, provides an improved method of injecting ammonia into a flue for waste gas, and is characterized by measuring the amounts of sulfuric acid components at uniformly spaced points over a transverse cross section of the flue, measuring the temperature at the uniformly spaced points, and then individually controlling the respective flow rates of the gaseous mixture discharged from at least one nozzle of each group of nozzles to conform the distribution of the injected ammonia to the measured sulfuric acid distribution taking into account the measured temperature distribution in the flue. The mixture of ammonia and air is brought to a temperature substantially equal to the temperature of the waste flue gas in the flue at the exit of the air heater, and then the mixture is injected into the flue from a number of nozzles arranged in uniformly distributed and widely spaced relation across the flue while regulating the respective flow rates of the nozzles.

The object of the invention is to prevent the corrosion or generation of an acid smut on the low temperature side of an oil burning boiler and to completely prevent the clogging of the nozzles with low melting point compounds or flue dusts, so as to maintain these effects over an extended period of time.

According to the present invention, since the mixture of ammonia and air is brought to a temperature substantially equal to the temperature of the waste flue gas at the exit of the air heater and then injected into the flue from a number of nozzles arranged in uniformly distributed and widely spaced relation in the flue, as stated above, tubes having the nozzles mounted therein are not cooled by the ammonia-air mixture, so that sulfuric acid components in the waste flue gas are not allowed to condense on the surfaces of these tubes and hence the clogging of the nozzles with the dusts can be completely prevented.

When a Ljungstrom air preheater is used, the temperature distribution and sulfuric acid component distribution tend to become non-uniform in the flue at the exit of the heater under the influence of rotation of the rotor but, according to the present invention, it is possible to inject ammonia in an amount which is adequate to such non-uniform temperature distribution and sulfuric acid component distribution, since the ammonia-air mixture at a temperature substantially equal to the temperature of the waste flue gas at the exit of the air heater is injected from a number of nozzles while regulating the respective flow rates thereof as described above, whereby the formation of low melting point compounds can be prevented and the clogging of the nozzles with the low melting point compounds can be completely prevented.

Furthermore, because of the characteristic feature of the invention as set forth above, the mixture of ammonia and air, supplied from respective supply sources, can be smoothly injected into the flue, at the exit of the air heater, from each nozzle to neutralize the sulfuric acid components in the waste flue gas with ammonia and, therefore, the corrosion or generation of an acid smut on the low temperature side of the oil burning boiler can be completely prevented.

DESCRIPTION OF THE PREFERRED EMBODIMENT

The present invention will be described in further detail by way of a preferred embodiment thereof shown in FIG. 2.

Figure 2:
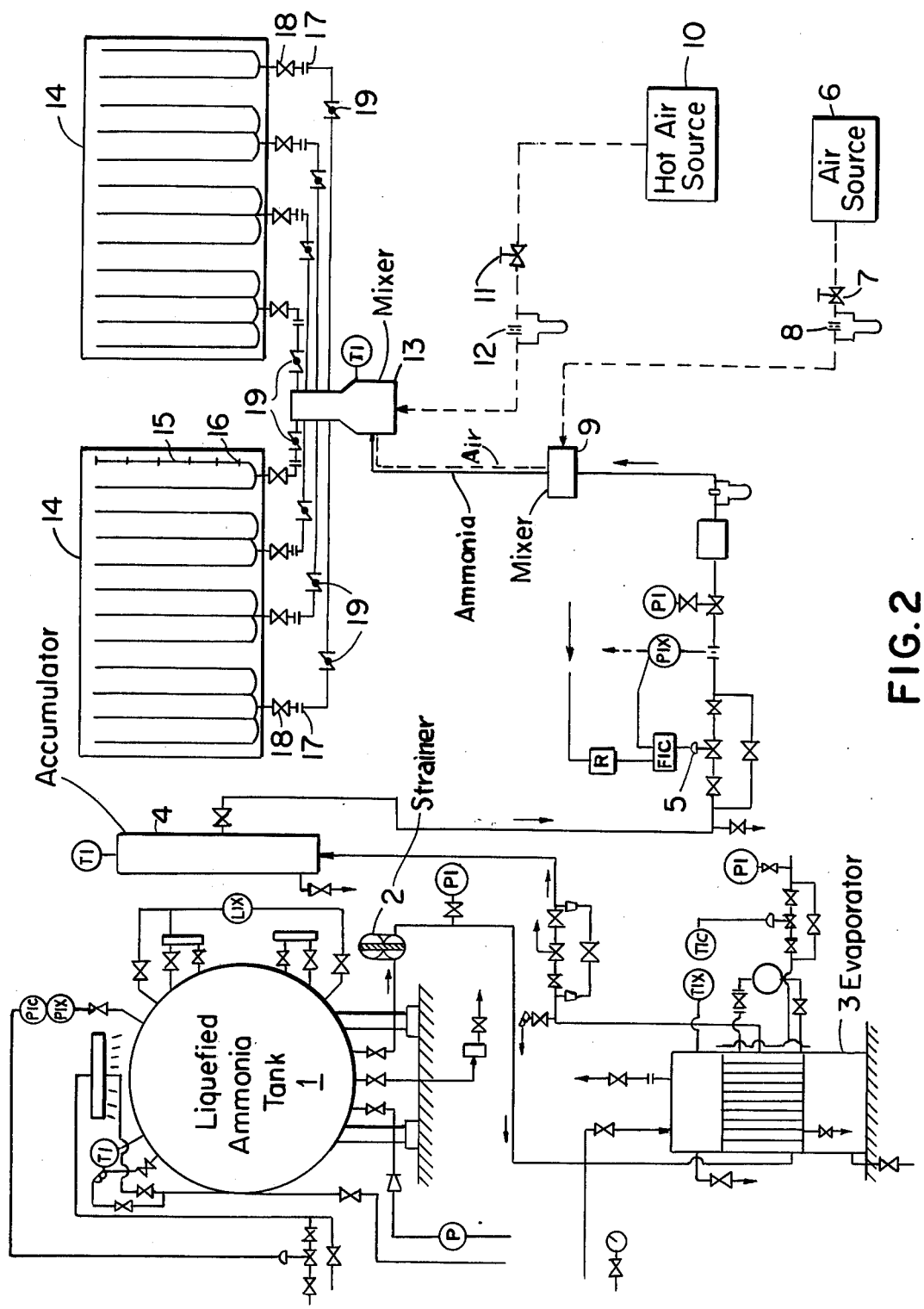
FIG. 2 is an illustrative view showing a method of injecting ammonia into a flue for waste gases according to the present invention.

Referring to FIG. 2, numeral 1 designates a liquefied ammonia tank, 2 a multi-layer strainer, 3 an ammonia evaporator and 4 an accumulator.

Numeral 5 designates valve means for regulating the flow rate of ammonia which is automatically regulated in response to an output signal (R→FIC) transmitted thereto from a central control room which generates the output signal upon sensing the boiler output or the flow rate of heavy oil corresponding to the quantity of waste flue gas.

Numeral 6 designates a source of air at the exit side of a forced draft fan, 7 a manually-operative damper, 8 a flow rate measuring orifice and 9 an ammonia mixing device. The quantity of air from the air source 6 which is to be mixed with ammonia gas in the ammonia mixing device 9 is controlled by the manually-operative damper 7 such that the concentration of ammonia gas in the ammonia-air mixture may be 3 – 6%.

Numeral 10 designates a source of hot air at the exit side of an air heater, 11 a manually-operative damper, 12 a flow rate measuring orifice and 13 a hot air mixing device. The quantity of air from the hot air source 10, which will be mixed in the hot air mixing device 13 with the ammonia-air mixture supplied from the mixing device 9, is controlled by the manually-operative damper 11 such that the temperature of the resultant mixture may be 100° – 150° C. While the mixture is illustrated, solely by way of example, as heated by direct heat exchange, it may equally well be heated by indirect heat exchange or transfer.

Numerals 14, 14 designate the flue at the exit of the air heater, 15 a plurality of groups (four groups in the embodiment shown) of nozzle pipes, and 16 nozzles removably mounted in each nozzle pipe 15.

Figure 3A:
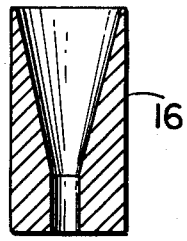
FIGS. 3a, 3b and 3c are axial sectional views respectively showing different types of nozzles.
Figure 3B:
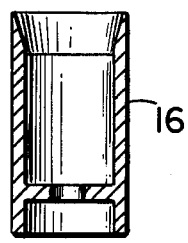
Figure 3C:
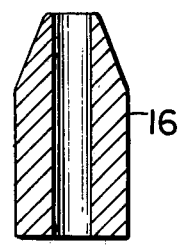
Figure 4:
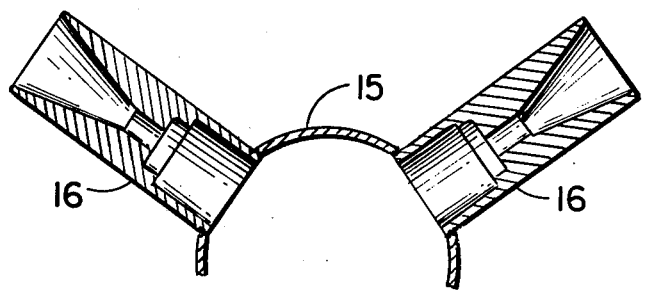
FIG. 4 is a diametric sectional view showing the nozzles, in axial section, as mounted in a nozzle pipe.

The nozzles 16 are of a shape which prevents the clogging of the nozzle to the greatest possible extent, and which may be, for instance, nozzles of a type having a forwardly expanding orifice which enables the range of diffusion to be adjusted by the degree of expansion of the orifice, producing less swirling flows and capable of diffusing fluid satisfactorily (see FIG. 3(a)), nozzles of a type having an orifice at an intermediate portion thereof in which the orifice portion and the nozzle portion can be fabricated separately from each other and which, therefore, can be fabricated with ease and are capable of diffusing fluid satisfactorily (see FIG. 3(b)), or nozzles of a type having a converged end which produces less swirling flows (see FIG. 3(c)) may optionally be used. These nozzles are arranged in each 0.2 – 0.3 m² of the cross sectional area of the flue, so that ammonia may be sufficiently diffused in the waste flue gas. Also, each nozzle is threadably mounted in the nozzle pipe 15 to facilitate the replacement thereof (see FIG. 4).

Numeral 17 designates orifices for checking the mixture flow rate and detecting clogging of the associated nozzles by sensing a pressure differential variation which will occur when clogging has occurred in any group of nozzles and the flow rate of ammonia gas in the associated nozzle pipe has changed. Numeral 18 designates shut-off valves and 19 designates dampers. The solid lines connecting the aforesaid respective elements and the arrows associated with these lines indicate the flow passages and flow directions of ammonia gas respectively, and the broken lines indicate the air passages.

Figure 1:
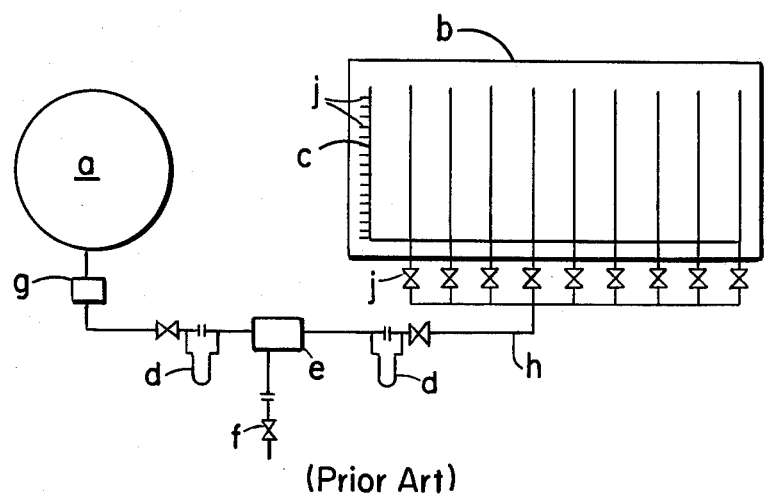
FIG. 1 is an illustrative view showing a conventional prior art apparatus for injecting ammonia into a flue for waste gases.

In FIG. 1, $j$ indicates nozzles or openings of equal size and $J$ indicates shut-off valves for cleaning of the nozzles.

Figure 6:
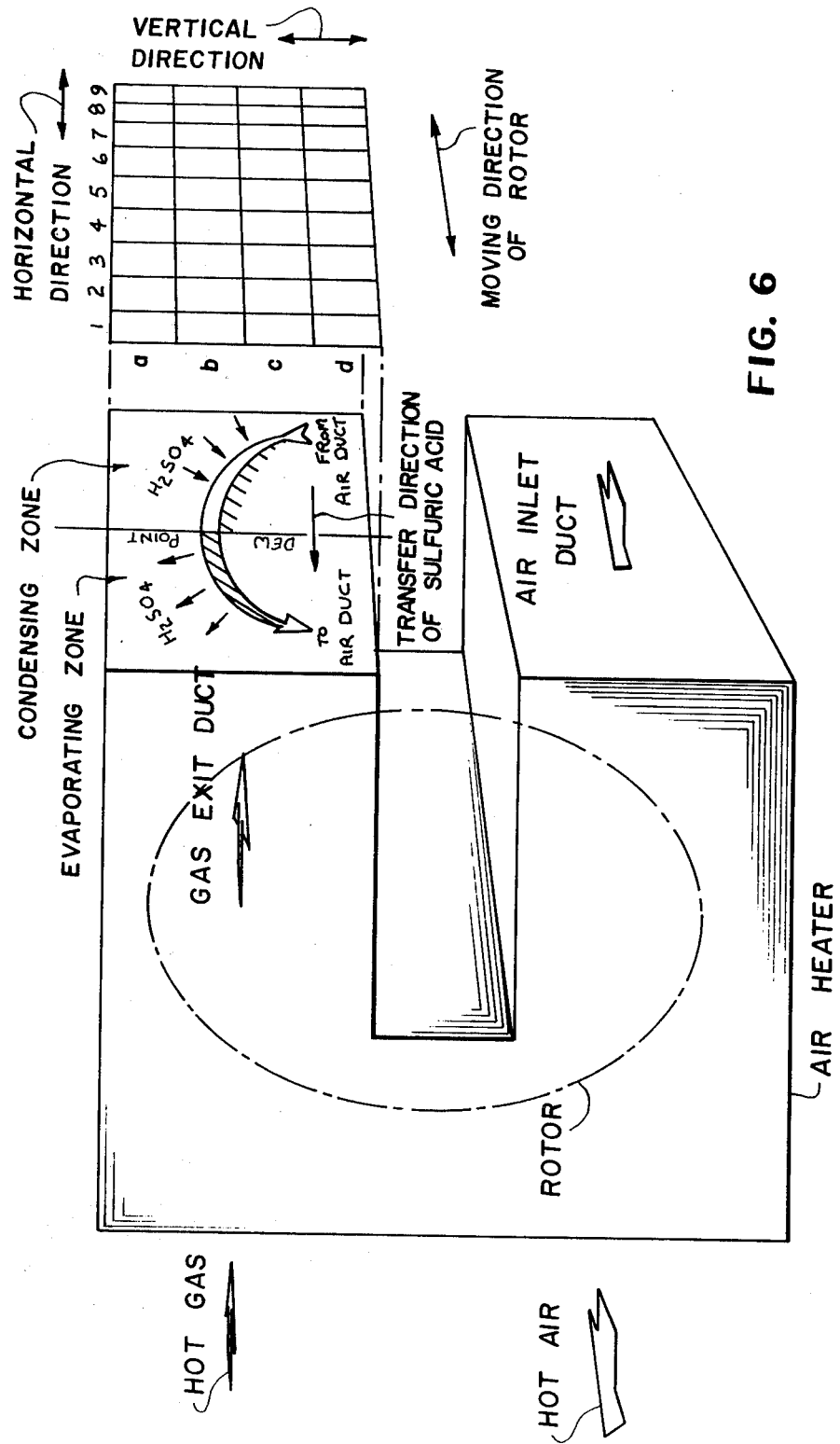
FIG. 6 is a perspective view of a Ljungstrom air preheater illustrating the air and gas ducts as well as the direction of rotation of the rotor and the coordinates of test points over the transverse cross section of the rectangular air duct.

Referring to FIG. 6, which illustrates photographically a Ljungstrom air preheater, the air inlet ducts and the hot gas outlet ducts have been illustrated in perspective. It will be further noted that, in the gas exit duct, there is a diagrammatic illustration of the rotation of the rotor in the "transfer direction of sulfuric acid", it being noted that to the right of a "dew point" line, there is a condensing zone for sulfuric acid and to the left of the "dew point line", there is an evaporating zone. In the condensing zone, the rotor is moving from the air duct toward the gas duct and, in the evaporating zone, the rotor is moving from the gas duct toward the air duct. There is also illustrated at the far right end of the gas exit duct a set of coordinates for reference points, these coordinates being taken across a transverse cross section of the gas exit duct, with the reference lines in the horizontal direction being indicated by the numerals 1 to 9 and the reference lines in the vertical direction being indicated by the letters $a$ to $d$. The perpendicularly intersecting reference lines divide the cross section of the gas duct into zones which can be designated, for example, 1a, 2d, 9c, etc. These designations are used in the Tables discussed hereinafter.

In a Ljungstrom air preheater, such as shown in FIG. 6, the rotor rotates between air (low temperature) and gas (high temperature). Therefore, the temperature distribution of the waste flue gas at the exit side of the air heater becomes non-uniform as shown in the Table A below:

Table A

| Measured Temperatures (° C) of Waste Flue Gas Over Transverse Cross-Section of Flue at the Exit of Air Heater (Difference (° C) from the Average Value (° C) | | | | | | | | | | |
|---|---|---|---|---|---|---|---|---|---|---|
| Horizontal Direction | 1 | 2 | 3 | 4 | 5 | 6 | 7 | 8 | 9 | Average |
| Vertical Direction | | | | | | | | | | |
| a | 5 | 5 | 2 | 1 | 0 | −2 | −3 | −7 | −13 | −1 |
| b | 8 | 9 | 7 | 7 | 4 | −1 | −4 | −8 | −13 | 1 |
| c | 9 | 12 | 10 | 7 | 3 | −5 | −5 | −9 | −15 | 1 |
| d | 9 | 13 | 11 | 5 | −1 | −7 | −8 | −11 | −16 | −1 |
| Average | 8 | 10 | 7 | 5 | 2 | −4 | −5 | −9 | −14 | 0 |

←Moving direction of rotor

Further, the sulfuric acid components in the waste flue gas from a boiler are present substantially entirely in the form of $SO_3$ gas at the inlet side (the temperature being higher than 300° C) of the air heater, but in different forms at the exit of the air heater due to rotation of the rotor. Namely, sulfuric gas condenses at a portion of the rotor surface where the temperature is below the dew point of acid, but evaporates at a portion thereof where the temperature is above the dew point and the sulfuric acid components move toward the higher temperature side of the rotor. In other words, the sulfuric acid components increase on the higher temperature side of the rotor, making the sulfuric acid component distribution as well as the temperature distribution non-uniform at the exit side of the air heater. Table A illustrates the actual gas temperatures, as measured, across the transverse cross-section of the gas exit duct of FIG. 6, at nine points (1–9 in the horizontal direction across the duct and four points (a–d) in the vertical direction across the duct, or a total of 36 points. Assuming that, theoretically, the temperature across the cross section of the duct is uniform, for example 140° C, Table A represents the differences from the uniform temperature of 140° C at each of the 36 points. Thus, the temperature at the highest point 2d is plus 13° C and the temperature at the lowest point 9d is −16° C, in other words 13° higher than 140° C, at point 2d, and 16° C lower than 140° C at point 9d, with the average temperature being 140° C.

The actually measured amounts of sulfuric acid components are shown in Table B below, by way of example, at 36 points also shown in Table A:

Table B

| | Measured Percentages of Sulfuric Acid Components Over Transverse Cross-Section of Flue at the Exit of the Air Heater (Average Value 100%) | | | | | | | | | |
|---|---|---|---|---|---|---|---|---|---|---|
| Horizontal Direction | 1 | 2 | 3 | 4 | 5 | 6 | 7 | 8 | 9 | Average |
| Vertical Direction | | | | | | | | | | |
| a | 139 | 148 | 112 | 109 | 94 | 86 | 83 | 62 | 48 | 98 |
| b | 160 | 143 | 148 | 145 | 115 | 99 | 75 | 68 | 55 | 112 |
| c | 159 | 137 | 127 | 117 | 91 | 62 | 65 | 58 | 51 | 95 |
| d | 150 | 137 | 137 | 92 | 121 | 92 | 44 | 40 | 43 | 96 |
| Average | 152 | 141 | 131 | 116 | 105 | 85 | 67 | 57 | 49 | 100 |

←Moving direction of rotor

As such, the temperature distribution and sulfuric acid component distribution at the exit side of the air heater are not uniform under the influence of rotation of the rotor. Therefore, ammonia is injected into the flue at the exit of the air heater, in an amount which is an amount corresponding to the sulfuric acid component distribution plus an amount compensating the temperature distribution. As stated, Table B shows examples of distribution of the measured amount of $SO_3$ at the 36 points. Thus, when the average amount of $SO_3$ inside the duct is taken as 100, there is a non-uniform distribution across the transverse cross section of the duct so that the largest value becomes 160 at point 1b and the smallest value becomes 40 at point 8d, with the largest value thus being four times the smallest value.

Accordingly, in case the temperature of the gas at each point of the cross section of the duct is uniform at, for example, 140° C, it is sufficient to prepare and inject ammonia in such an amount as described in Table B at each point. In this case, and by so doing, at each point an $SO_3$-$NH_3$ reaction product in a theoretically equimolar ratio is to be produced, and it suffices that the reaction product does not melt at the temperature of 140° C and does not adhere to a precipitator at the rear of the duct. However, in the cross-section inside the duct at the exit of the air heater, the actual gas temperature is non-uniform as illustrated in Table A.

Thus, in case an $SO_3$-$NH_3$ reaction product is produced at a point having the average temperature of 140° C, such as the point 5a in Table A, and which does not melt and adhere at that temperature, at a point of a higher temperature of 140° C plus 13° C or 150° C, at point 2d, there is a possibility that the reaction product would melt and adhere.

Figure 5:
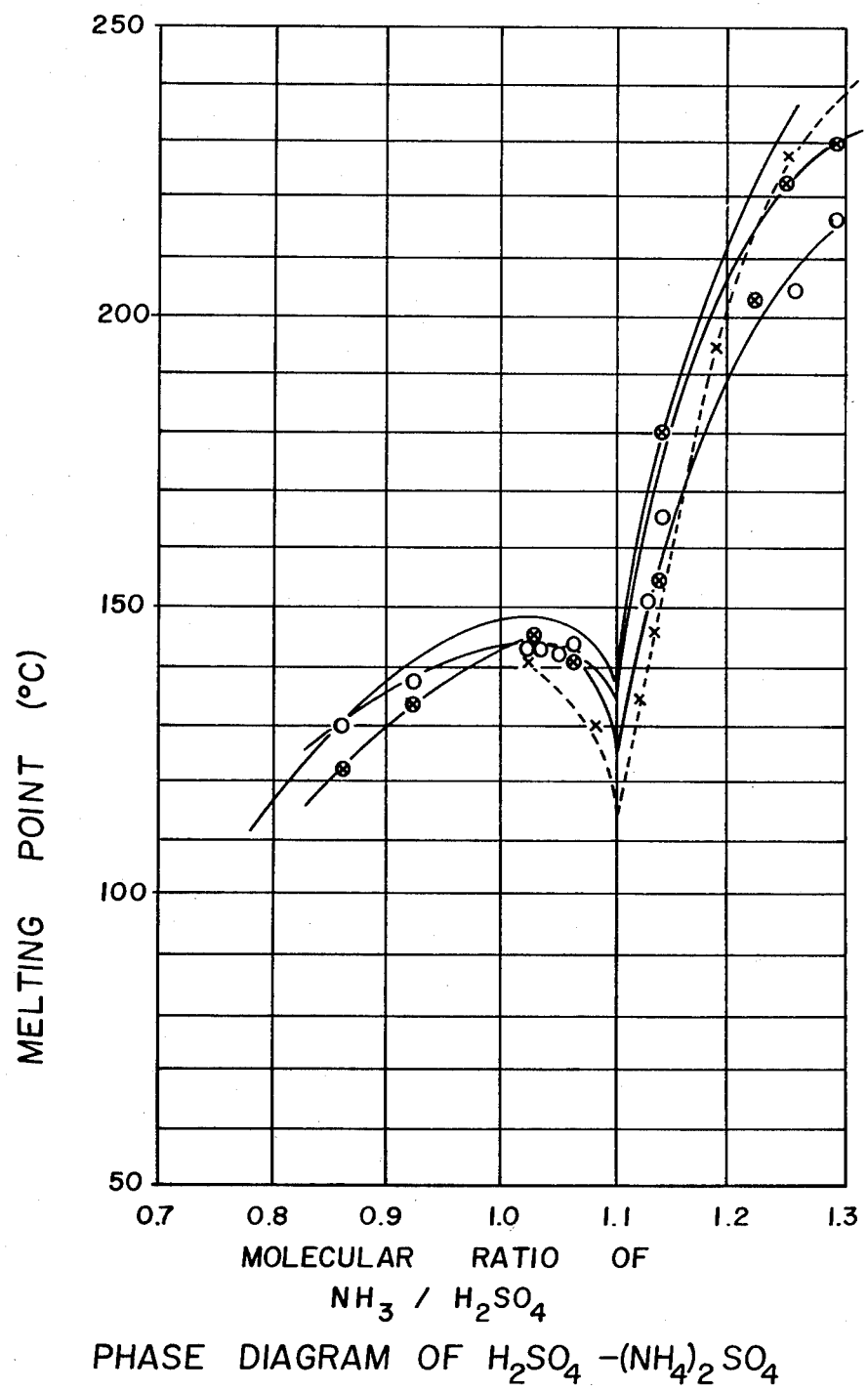
FIG. 5 is a phase diagram of $H_2SO_4 - (NH_4)_2SO_4$.

Referring to the phase diagram of FIG. 5, at a point having a gas temperature of 140° C, it suffices to inject $NH_3$ in such an amount that the $NH_3$/$H_2SO_4$ molar ratio becomes at least 1.10 – 1.12. However, at a point having a gas temperature of 150° C, $NH_3$ in a larger amount must be injected so that the molar ratio may become at least 1.12 – 1.14. Namely, at this temperature range of 150° C, it is necessary to increase the molar ratio of 0.02.

The absolute amount of the mentioned compensatory amount to the mentioned temperature is decided empirically after inferring and calculating it by taking into account several conditions, such as the amount of $SO_3$, the average temperature inside the duct and the reaction period until the reaction product reaches the precipitator at a position where the reaction product will not melt or adhere to the precipitator. It must be taken further into consideration that the molar ratio of the reaction product is measured when the apparatus is actually in operation. The basis of this calculation by inference will now be explained.

In the case of a temperature difference of 25° C from the uniform temperature of 140° C, there is a difference between 140° C and 165° C to which the relation of FIG. 5 will be applied. In this case, the $SO_3$ - $NH_3$ molar ratio, at positions of 140° and 165°, become 1.10 – 1.12 and 1.13 – 1.15, respectively. Consequently, $NH_3$ in an amount larger by 0.03 mol must be injected at a position having a temperature of plus 25° C, namely a position having a temperature of 165° C. The actual difference in amount of $NH_3$ to be injected at this time may be easily calculated if only the amount of $SO_3$ at that point is determined. For example, when the amount of $SO_3$, namely the amount passing through the gas duct, is 1 mol/h at each point, the amount of $NH_3$ to be injected to simply determined to be 1.10 – 1.12 mol/h at a position having a temperature of 140° C and 1.13 – 1.15 mol/h at a position having a temperature of 165° C.

The foregoing calculation example entirely ignores the element of the reaction period or time, the reaction of the reaction product actually proceeding from the outer surface, and it is necessary to consider a period in the reaction. A larger amount of ammonia needs to be injected into a portion where the temperature of waste flue gas is higher, since the melting point of the ammonia-sulfuric acid compound is higher as the molar ratio of $NH_3 : H_2SO_4$ is higher. The calculated amount distribution of ammonia to be injected is shown in Table C below by way of example:

Table C

Calculated Amount Distribution of Ammonia to be Injected Over Transverse Cross-Section of Flue at the Exit of Air Heater (Compensated by Temperature) (Average Value 100%)

| Horizontal Direction | 1 | 2 | 3 | 4 | 5 | 6 | 7 | 8 | 9 | Average |
|---|---|---|---|---|---|---|---|---|---|---|
| Vertical Direction | | | | | | | | | | |
| a | 144 | 154 | 116 | 105 | 89 | 78 | 74 | 51 | 34 | 93 |
| b | 175 | 158 | 159 | 155 | 117 | 92 | 65 | 55 | 39 | 113 |
| c | 176 | 159 | 144 | 125 | 91 | 53 | 55 | 45 | 35 | 98 |
| d | 166 | 162 | 157 | 95 | 112 | 75 | 35 | 30 | 28 | 96 |
| Average | 165 | 158 | 143 | 120 | 102 | 75 | 57 | 45 | 34 | 100 |

←Moving direction of rotor

The actual calculation is made in a manner which will now be described. Of the 36 points inside the duct, when the cases of four representative points are illustrated they become the following:

Table D

| Flue Position | Value-Table C | Value-Table B | Difference of Value-Table C & B | Temp. Difference Table A |
|---|---|---|---|---|
| 3c | 144 | 127 | +17 | +10° C |
| 1a | 144 | 139 | + 5 | + 5° C |
| 6c | 55 | 65 | −10 | − 5° C |
| 9c | 35 | 51 | −16 | −15° C |

In the above comparison, point 3c has a higher temperature by 25° C than that at point 9c and an amount of $SO_3$ which is 125/51 = 2.5 times the amount of $SO_3$ at point 9c. Thus, if only the distribution of $SO_3$ is considered, 2.5 times the amount of $NH_3$ to be injected at the point 3c will be sufficient as compared with point 9c. The reason why there is a difference of 144/35 = 4.1 times the amount of $NH_3$ to be injected at points 3c and 9c is that a difference in temperature of 25° C must be taken into consideration.

Now, when the amount of $SO_3$ at point 9c is presumed to be one mol/h, expressed as the amount passing through the duct, and $NH_3$ is injected in the amount of the chemical equivalent, the amount of $NH_3$ to be injected becomes 2 mol/h. Correspondingly, at point 3c, when the distribution of $SX_3$ only is considered, because the amount of $SO_3$ is 2.5 mol/h, the amount of $NH_3$ to be injected becomes 2.5 times 2 = 5 mol/h. However, when a difference in temperature of 25° C is taken into account, the $NH_3$ must be injected in an amount of 4.1 × 2 = 8.2 mol/h.

However, in judging whether melting and adherence is effected unless $NH_3$ is injected as the amount of the chemical equivalent, by all means at a temperature at point 9c, the behavior of the reaction product, whose reaction proceeds to a greater extent on the outer surface, must be taken into account. Therefore, this is considered in the disclosure as being a ratio of non-uniformity to the average value 100.

As mentioned, the melting point of the reaction product varies in accordance with the molar ratio of ammonia to sulfuric acid, and this is made clearly apparent by the phase diagram of FIG. 5 and the following table:

Table E

Compounds of $NH_3$ and $H_2SO_4$

| compound | molecular formula | molecular ratio of $NH_3/H_2SO_4$ | melting point (° C) | remarks |
|---|---|---|---|---|
| Sulfuric acid | $H_2SO_4$ | 0 | 10.4 | |
| Ammonium hydro sulfate | I $NH_4H_3(SO_4)_2$ | 0.5 | 48.0 | |
| " | II $NH_4HSO_4$ | 1.0 | 146.9 | |
| " | III $(NH_4)_4H_2(SO_4)_2$ | 1.33 | | |
| " | IV $(NH_4)_3H(SO_4)_2$ | 1.5 | | |
| Ammonium sulfate | $(NH_4)_2SO_4$ | 2.0 | 513 | resolves to $NH_4HSO_4$ at 160–250° C |

In FIG. 5 and Table E, the variation of the melting point of the reaction product, in accordance with the molar ratio of ammonia to sulfuric acid, is shown with a binary component system of ammonia and sulfuric acid. Actually, however, a trinary component system of ammonia, sulfuric acid and water must be considered. Thus, in accordance with the invention, ammonia is injected in accordance with the non-uniform gas temperatures to an extent such that the molar ratio of ammonia ($NH_3$) to sulfuric acid ($H_2SO_4$) assures that the reaction product will not be melted at a particular gas temperature.

Generally, the molar ratio has a value of not less than 1.3. The decision as to the amount of ammonia to be injected for this purpose is effected by taking into account, in addition to the temperature distribution and the sulfuric acid component distribution, the limitation of the reaction time and the excess amount of ammonia. In short, the invention method involves injecting with a distribution with neither an excess of ammonia nor a shortage of ammonia, and is characterized by injecting a larger amount of ammonia to the zone where the gas temperature is high and the sulfuric acid component is larger than the amount of ammonia injected to a portion where the gas temperature is low and the amount of the sulfuric acid component is small, in a manner such that there is not produced a molten reaction product in the particular zone.

The distribution of the injected ammonia is determined by the orifice diameter distribution of the nozzles 16 provided in the flue 14. Therefore, the orifice diameters of the nozzles 16 in the respective groups should be determined at suitable values before the injection of ammonia, so as to meet the sulfuric acid component distribution provided above.

Strictly speaking, the sulfuric acid component distribution is variable depending upon the flow rate and average temperature of the waste gas flue gas, but the deviation is so small as to be negligible.

The completely gasified ammonia gas in the evaporator 3 is supplied to the ammonia mixing device 9 while the flow rate thereof is being regulated by the valve means 5 which operates upon sensing the flow rate of fuel. In the mixing device, the ammonia gas thus supplied is mixed with air supplied from the air source 6, to form a mixed gas in which the ammonia concentration is 3 – 6%. The ammonia-air mixture thus formed is supplied to the hot air mixing device 13, wherein it is mixed with hot air supplied from the hot air source 10 and thus an ammonia-air mixture which is at a temperature substantially equal to the temperature of the waste flue gas, i.e., at a temperature of 100° – 150° C, is formed. The mixture is then led into the nozzle pipes 15 and discharged into the flue 14, 14 from the nozzles 16.

It has to be understood that, while the present invention has been described herein with reference to an apparatus comprising a Ljungstrom air heater, the air heater is not necessarily of a rotary type but any other type of heater may be used, provided that it is capable of varying the temperature distribution and sulfuric acid component distribution of the waste flue gas in the flue.

It is also to be understood that, although the present invention has been described in terms of a specific embodiment thereof, it is not restricted only to the embodiment described but many changes and modifications are possible without deviating from the spirit of the invention.

While a specific embodiment of the invention has been shown and described in detail to illustrate the application of the principles of the invention, it will be understood that the invention may be embodied otherwise without departing from such principles.

What is claimed is:

1. In a method of injecting a gaseous mixture of ammonia and air into an exit flue, connected to the flue gas discharge end of an air heater receiving waste hot gas from an oil-fired boiler and having an air supply conduit and effecting heat exchange between the hot gases in a flue, leading from the boiler to the air heater, and the cooler air in the air conduit, from a number of spaced nozzles arranged in the exit flue, downstream of the air heater, in spaced groups distributed substantially uniformly across the exit flue cross-section and each including at least one nozzle, to neutralize sulfuric acid components in the flue gas, with the exit flue having positioned therein, downstream of the nozzles, structures including precipitators, the improvement comprising measuring the amounts of sulfuric acid components at uniformly spaced points of a rectangular grid extending across the exit flue cross-section downstream of the air heater; measuring the temperature at such uniformly spaced points; setting a distribution pattern of the gaseous mixture discharged from at least one nozzle of each group of nozzles to conform the distribution of the injected ammonia to the measured sulfuric acid component distribution; and compensating for the non-uniform distribution of the sulfuric acid components and the non-uniform temperature distribution over the cross-section of the exit flue downstream of the air heater by controlling total flow of ammonia, without modifying such distribution pattern, so as to adjust individually the molar ratio of the injected ammonia to the sulfuric acid components at each point in accordance with the measured temperature at the respective point, to a value such that the resulting reaction products will not melt and adhere to any structure connected to the exit flue downstream of the air heater.

2. In a method of injecting a gaseous mixture of ammonia and air into an exit flue, connected to the flue gas discharge end of an air heater having a rotor rotating between an air supply conduit and the exit flue to effect heat exchange between the hot gases in a flue, leading from the boiler to the air heater, and the cooler air in the air conduit, from a number of spaced nozzles arranged in the exit flue, downstream of the air heater, in spaced groups distributed substantially uniformly across the exit flue cross-section and each including at least one nozzle, to neutralize sulfuric acid components in the flue gas, the improvement comprising measuring the amounts of sulfuric acid components at uniformly spaced points across the exit flue cross-section downstream of the air heater; measuring the temperature at such uniformly spaced points; setting a distribution pattern of the gaseous mixture discharged from at least one nozzle of each group of nozzles to conform the distribution of the injected ammonia to the measured sulfuric acid component distribution; and compensating for the non-uniform distribution of the sulfuric acid components and the non-uniform temperature distribution over the cross-section of the exit flue downstream of the air heater, due to such rotation of the air heater rotor, by controlling total flow of ammonia, without modifying such distribution pattern, so as to adjust individually the molar ratio of the injected ammonia to the sulfuric acid components at each point in accordance with the measured temperature at the respective point, to a value such that the resulting reaction products will not melt and adhere to any structure connected to the exit flue downstream of the air heater.

* * * * *